(12) United States Patent
Sasai

(10) Patent No.: US 7,828,334 B2
(45) Date of Patent: Nov. 9, 2010

(54) JOINT PART FOR RESIN FUEL TANK

(75) Inventor: Kensuke Sasai, Komaki (JP)

(73) Assignee: Tokai Rubber Industries, Ltd., Komaki-shi (JP)

( * ) Notice: Subject to any disclaimer, the term of this patent is extended or adjusted under 35 U.S.C. 154(b) by 578 days.

(21) Appl. No.: 11/783,640

(22) Filed: Apr. 11, 2007

(65) Prior Publication Data
US 2007/0241557 A1 Oct. 18, 2007

(30) Foreign Application Priority Data
Apr. 12, 2006 (JP) .............................. 2006-109934

(51) Int. Cl.
*F16L 13/00* (2006.01)
(52) U.S. Cl. .................. 285/285.1; 285/288.1; 285/423
(58) Field of Classification Search .............. 285/285.1, 285/288.1, 423, 919
See application file for complete search history.

(56) References Cited

U.S. PATENT DOCUMENTS

| | | | | |
|---|---|---|---|---|
| 4,243,457 | A * | 1/1981 | Mayumi et al. | 156/245 |
| 4,676,532 | A * | 6/1987 | Gronau et al. | 285/133.5 |
| 4,718,700 | A * | 1/1988 | Horch et al. | 285/133.5 |
| 5,568,949 | A * | 10/1996 | Andre | 285/285.1 |
| 6,357,802 | B1 * | 3/2002 | Nozato et al. | 285/340 |
| 6,398,059 | B1 | 6/2002 | Hayashi et al. | |
| 6,676,165 | B2 | 1/2004 | Iio et al. | |
| 6,933,028 | B2 * | 8/2005 | Milhas | 428/36.91 |
| 7,479,315 | B2 | 1/2009 | Tamura et al. | |
| 2002/0159825 | A1 | 10/2002 | Ito et al. | |
| 2005/0127668 | A1 * | 6/2005 | Mobley et al. | 285/288.1 |
| 2006/0099365 | A1 | 5/2006 | Sasai et al. | |

FOREIGN PATENT DOCUMENTS

| | | |
|---|---|---|
| JP | 55-110433 U | 8/1980 |
| JP | 6-294484 A | 10/1994 |
| JP | 7-52333 A | 2/1995 |
| JP | 06-270701 B2 | 2/1998 |
| JP | 10-180911 A | 7/1998 |

(Continued)

OTHER PUBLICATIONS

Japanese Decision of Patent Grant dated Jun. 29, 2010, issued in corresponding Japanese Patent Application No. 2006-109934.

*Primary Examiner*—Aaron Dunwoody
*Assistant Examiner*—Fannie Kee
(74) *Attorney, Agent, or Firm*—Westerman, Hattori, Daniels & Adrian, LLP

(57) ABSTRACT

A joint part including a welding portion with a rim of an opening of a fuel resin tank as well as a high barrier property on its interface. The joint part has a multi-layer structure including a barrier layer and at least one of an inner layer and an outer layer coaxially laminated on an inner periphery and/or an outer periphery of the barrier layer, respectively, wherein the barrier layer is formed by a compound material composed of one or more of fuel permeation-resistant resin, such as ethylene vinyl alcohol copolymer, polyamide polyester or liquid crystal polymer, and polyethylene, while the inner layer and the outer layer are composed of high-density polyethylene or modified high-density polyethylene.

8 Claims, 3 Drawing Sheets

FOREIGN PATENT DOCUMENTS

| | | |
|---|---|---|
| JP | 10-182970 A | 7/1998 |
| JP | 2001-98492 A | 4/2001 |
| JP | 2001-200961 A | 7/2001 |
| JP | 2001-239613 A | 9/2001 |
| JP | 2001-341255 A | 12/2001 |
| JP | 2002-160537 A | 6/2002 |
| JP | 2002-242783 A | 8/2002 |
| JP | 2003-194280 A | 7/2003 |
| JP | 2004-143311 A | 5/2004 |
| JP | 2005-315406 A | 11/2005 |

* cited by examiner

JOINT PART FOR RESIN FUEL TANK

BACKGROUND OF THE INVENTION

1. Field of the Invention

This invention relates to a joint part, such as a connecting pipe or a connecting valve, attached to a resin fuel tank.

2. Description of the Art

As a joint part such as a connecting pipe or a connecting valve, attached to a rim of an opening of an automotive resin fuel tank, resin-made joint parts have been recently employed. Generally, such a resin-made joint part is attached to a resin fuel tank by means of heat plate welding.

Such a resin fuel tank generally has a multi-layer structure containing a low fuel permeation layer formed of a material capable of lowering fuel permeation, such as an ethylene vinyl alcohol copolymer (EVOH), in consideration of prevention of evaporative emission, and an outermost layer formed of, for example, high density polyethylene (HDPE) for impact resistance, chemical resistance, water resistance, economical reasons and the like.

As a joint part such as the above-mentioned connecting pipe, a low fuel permeation material, such as polyamide 12 (PA12), is employed. However, such a joint part made of the PA12 does not adhere well to the outermost layer made of HDPE or the like of the resin fuel tank. Therefore, there has been proposed a joint part including a welding member 60 interposed and welded between a joint part 50 and an outermost layer of a resin fuel tank T, as shown in FIG. 4 (see Japanese Patent No. 2715870). The welding member 60 is made of polyethylene resin such as modified polyethylene, which is strongly weldable to both of such a joint part and such an outermost layer.

It is necessary that a certain thickness of the above-mentioned welding member 60 should be maintained after the welding member is welded therebetween in terms of welding accuracy. Further, the welding member 60 has an insufficient effect of preventing permeation (evaporative emission) of gasoline, especially, gasohol (alcohol-containing gasoline). In other words, polyethylene resin, such as modified polyethylene, as a material for forming the welding member 60, has sufficient weldability, however, a low barrier effect against fuel. For this reason, such a joint part has a defect that fuel may permeate through the welding member 60 and thus evaporate to the outside.

SUMMARY OF THE INVENTION

Accordingly, it is an object of the present invention to provide a joint part including a welding portion having excellent weldability with a rim of an opening of a fuel resin tank as well as a high barrier property on its interface.

To this end, according to the present invention, there is provided a joint part for a resin fuel tank having an approximate cylindrical shape and a welding portion at its distal end to be positioned and welded to a rim of an opening end of the resin fuel tank, in which at least the welding portion comprises an approximate cylindrical barrier layer formed by the following (A) and an approximate cylindrical welding layer formed by the following (B) on at least one surface of an inner periphery and an outer periphery of the barrier layer;
(A) a compound material obtained by blending polyethylene into at least one selected from the group consisting of an ethylene vinyl alcohol copolymer, polyamide, polyester and liquid crystal polymer:
(B) a high density polyethylene or a modified high density polyethylene.

To obtain a joint part attached to a resin fuel tank, which is excellent both in weldability and a barrier property on a welding portion to be welded with a rim of an opening end of the resin fuel tank, the present inventor has piled intensive studies on a construction of the joint part. As a result, he found that when at least the welding portion comprises an approximate cylindrical barrier layer formed by the above-mentioned (A) and an approximate cylindrical welding layer formed by the above-mentioned (B) on at least one surface of an inner periphery and an outer periphery (i.e., an inner periphery and/or an outer periphery) of the barrier layer, the barrier layer formed by the above-mentioned (A) has an excellent barrier property to fuel and also the welding layer formed by the above-mentioned (B) exerts excellent weld strength to the HDPE or the like, an outermost layer material of the resin fuel tank. Further, adhesion between the barrier layer and the welding layer is increased, so that an interface of the both layers may not be peeled and thus fuel leakage therefrom may not occur. Thus, they attained the present invention.

Since at least the welding portion of the joint part according to the present invention has a two-layer structure having an approximate cylindrical shape, in which the barrier layer is formed by the above-mentioned (A) and the welding layer is formed by the above-mentioned (B), the welding portion has excellent weldability with a rim of an opening of a fuel resin tank as well as a high barrier property to fuel.

When a main component of the polyethylene of the above-mentioned (A) is an acid-modified polyethylene, the barrier property to fuel is further enhanced.

When the component (A) is a compound material having an island-sea structure wherein islands each comprising polyethylene are dispersed in a sea phase comprising at least one selected from the group consisting of an ethylene vinyl alcohol copolymer, polyamide, polyester and liquid crystal polymer, the barrier property to fuel is even further enhanced.

When the barrier layer has a thickness of 0.05 mm to 0.8 mm, a following property of the barrier layer to transformation of the joint part becomes good and thus tensile elongation at break may be not less than 200%. Further, even if an impact is imparted at a low temperature of about −40° C., the barrier layer can absorb such an impact and thus may not be broken. In other words, the barrier layer can maintain a barrier property to fuel under a certain degree of severe condition.

DESCRIPTION OF THE PREFERRED EMBODIMENTS

Embodiments of the present invention will be described in detail below. However, it should be noted that the present invention is not limited thereto.

Figure 1:
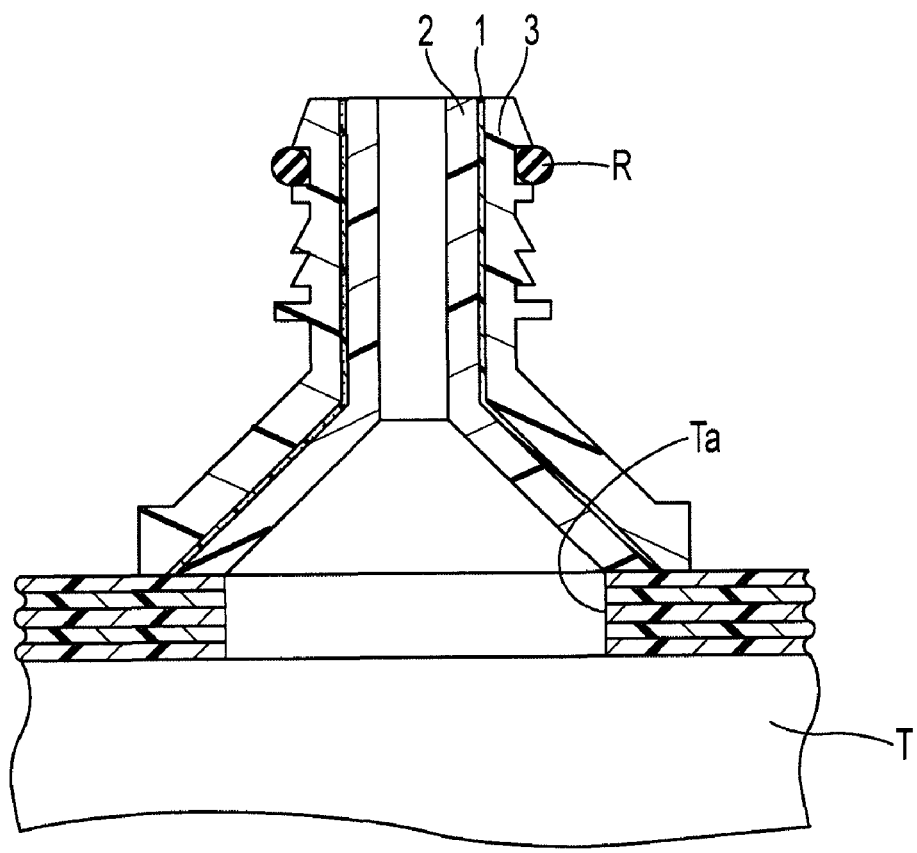
FIG. 1 is a sectional view illustrating one example of a joint part, according to the present invention, welded to a resin fuel tank.

FIG. 1 illustrates one embodiment in which a joint part according to the present invention is welded to a rim of an opening Ta of a resin fuel tank T. In this embodiment, a connecting pipe for connecting a joint part with a fuel hose (not shown) is described as one example of a joint part according to the present invention. An upper half of the joint part for incorporating the fuel hose has a certain inner diameter, while a lower half thereof has an approximate cylindrical shape wherein both ends of an inner diameter and an outer diameter are widened toward the end. A peripheral wall for forming the approximate cylindrical shape has a three-layer structure of a barrier layer 1, an inner (welding) layer 2 and an outer (welding) layer 3, which are each made of the following materials described in detail and are laminated coaxially from an upper end thereof through a lower end. In FIG. 1, a reference numeral R indicates an O-ring. The resin fuel tank generally has a five-layer structure of an HDPE layer, a modified HDPE layer, an EVOH layer, a modified HDPE layer and an HDPE layer from outside in this order.

The material for forming the barrier layer 1 of the above-mentioned three-layer structure is a compound material obtained by blending polyethylene into fuel-permeation-resistant resin. Examples of the fuel-permeation-resistant resin include ethylene-vinyl alcohol copolymer (EVOH), polyamide (PA), polyester and liquid crystal polymer (LCP), which may be used either alone or in combination. Examples of the PA include aliphatic PA such as polyamide 6 (PA6) and polyamide 12 (PA12), semiaromatic PA such as polyamide MXD6. Examples of the polyester include polybutylene terephthalate (PBT) and polybutylene naphthalate (PBN). Examples of the polyethylene include high-density polyethylene (HDPE) and modified HDPE. The barrier layer 1 generally has a thickness of 0.01 mm to 5 mm, preferably 0.05 mm to 0.8 mm in terms of good tensile elongation at break and good impact resistance at low temperature, as described below.

Each material for forming the inner layer 2 and the outer layer 3, formed on an inner peripheral surface and an outer peripheral surface of the barrier layer 1, respectively, is high-density polyethylene (HDPE) or modified HDPE and may be the same or different from each other. Each thickness of the inner layer 2 and the outer layer 3 is generally 0.01 mm to 10 mm, preferably 0.2 mm to 7 mm, respectively, in terms of sufficient weldability and may be the same or different from each other.

The above-mentioned three-layered connecting pipe may be produced by an insert molding, a two-color molding or a sandwich molding. The thickness of the peripheral wall (having a three-layer structure) is generally 0.5 mm to 10 mm.

A melting point of the barrier layer 1 is near to melting points of the inner layer 2 and the outer layer 3, preferably the same, for easy welding of such a connecting pipe with the resin fuel tank. The same temperature is generally not less than 220° C. This is because at least one layer of the barrier layer 1, the inner layer 2 and the outer layer 3 may not be melted and not be transformed, which prevents melt welding of an outermost layer of the resin fuel tank and the connecting pipe. The melting point of the barrier layer 1 may be determined by selecting a temperature among melting points of ethylene-vinyl alcohol copolymer, polyamide, polyester and a liquid crystal polymer in the above-mentioned materials, or by blending polyethylene at not less than 10% by volume. The melting point of the inner layer 2 and the outer layer 3 may be approached to the melting point of the barrier layer 1 by adjusting the molecular weight of the inner layer and the outer layer, respectively, so as to control melt viscosity thereof in the above-mentioned materials.

Figure 4:
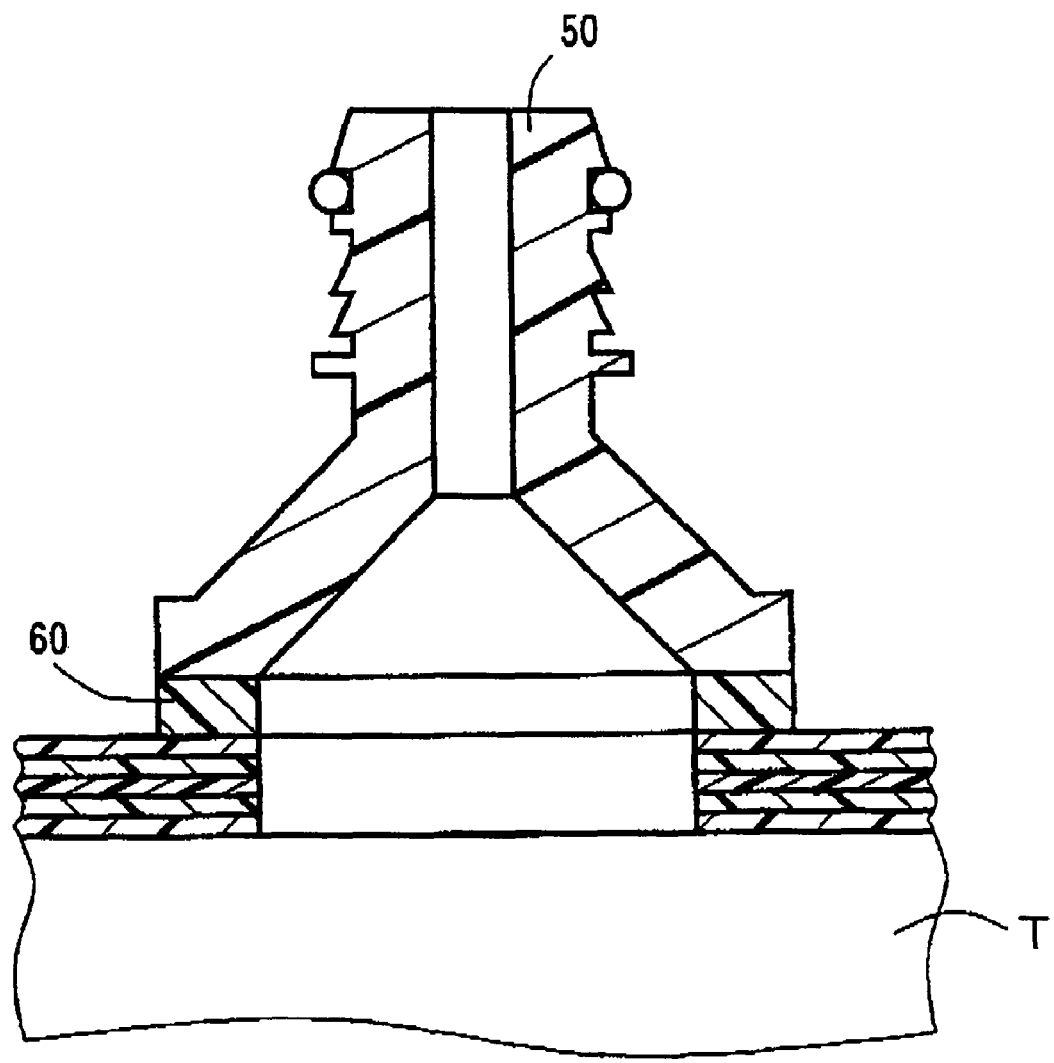
FIG. 4 is a sectional view illustrating a conventional joint part welded to a resin fuel tank.

When the above-mentioned materials are used for forming each layer of the three-layer structure, the barrier layer 1 can be welded to the outermost layer material (such as HDPE) of the fuel resin tank and its interface exhibits a high barrier property to fuel. Even if the thickness of the barrier layer 1 is decreased, such a barrier layer can exhibit a high barrier property to fuel. For this reason, the thickness of the barrier layer 1 can be decreased. Further, since the inner layer 2 and the outer layer 3 can exert excellent weldability to the outermost layer material, such as HDPE, of the fuel resin tank, a welding part 60 (shown in FIG. 4), conventionally required, can be omitted.

Further, interlaminar adhesion between the barrier layer 1 and the inner layer 2, and interlaminar adhesion between the barrier layer 1 and the outer layer 3 are both increased. This is because affinity on each interface becomes good due to polyethylene contained in each layer. For this reason, each interface may not be peeled, so that fuel may not leak.

The material (specific compound material) for forming the barrier layer 1 requires much energy for welding, which means that the melting point is increased or the melting time is prolonged, as compared with the material (such as modified HDPE) for forming the inner layer 2 and the outer layer 3 in the case where the barrier layer has the same thickness as those of the inner layer and the outer layer. However, since the thickness of the barrier layer 1 can be decreased as mentioned above, heat energy for welding can be decreased, which means that the melting point is decreased or the melting time is shortened.

Even if a material having a hygroscopic property is employed for forming the barrier layer 1, weldability may not be deteriorated because the inner layer 2 and the outer layer 3, both which are made of HDPE or the like, excellent in water resistance, are formed on both sides of the barrier layer 1, otherwise weldablity tends to be deteriorated by absorption.

Especially, when the thickness of the barrier layer 1 is 0.05 to 0.8 mm, the barrier layer 1 can follow suitably deformation of the connecting pipe, and the tensile elongation at break of the barrier layer 1 may be not less than 200%. Even if an impact is imparted at a low temperature of about −40° C., the barrier layer 1 can absorb such an impact and may not be broken. In other words, the barrier layer 1 maintains its barrier property to fuel under a certain degree of severe condition, so that fuel leakage can be prevented.

The inner layer 2 has high resistance against inferior gasoline or gasoline additives as well as high chemical resistance such as acid resistance or alkali resistance due to its material. The outer layer 3 has high chemical resistance such as calcium chloride resistance, car shampoo resistance, washer fluid resistance or battery fluid resistance due to its material.

A method for welding the connecting pipe and the resin fuel tank is not specifically limited, but may preferably be a heating plate welding method, a vibration welding method, an ultrasonic welding method or a laser welding method, because high weld strength can be obtained. However, a hot gas welding method or a spin welding method may also be employed.

The materials for forming each layer will be described in detail hereinafter.

The compound material for forming the barrier layer 1 is obtained by blending polyethylene into fuel-permeation-resistant resin such as EVOH. Such polyethylene is preferably mainly composed of acid modified polyethylene in terms of an excellent barrier property to fuel. Further, the compound material is preferably an alloy material mainly composed of EVOH and modified HDPE, since it exerts an excellent barrier property to fuel even if the resultant barrier layer 1 is thin. Among them, the main component of the modified HDPE is preferably a maleic anhydride residue, a maleic acid group, an acrylic acid group, a methacrylic acid group, an acrylic ester group, a methacrylic ester group, a vinyl acetate group or an amino group, or has two or more kinds of functional groups The compound material is an alloy material obtained by kneading the EVOH and the specific modified HDPE at not more than melting points thereof such that the EVOH is preferably present at 30% to 90% by volume and the specific modified HDPE is preferably present at 70% to 10% by volume, and the modification ratio of the specific modified HOPE is preferably 0.01 to 5% by weight. Further, "main component" typically means a component occupying more than half, and also means a component occupying the entire.

Especially, when the EVOH and the specific modified HDPE are kneaded with high-shearing, the EVOH forms a matrix and the specific modified HDPE forms a domain, wherein an island phase of the HDPE is dispersed in a sea phase of the specific modified EVOH. It is thought that a hydroxyl group of the EVOH and a modification group of the specific modified HDPE form a hydrogen bonding or a covalent bonding. As a result, an affinity between the EVOH and the modified HDPE is increased, and the diameters of dispersed particles comprising the modified HDPE become extremely small (less than 10 µm), and such diameters do not substantially vary. For this reason, even if the thickness of the barrier layer 1 is decreased, such a barrier layer can exhibit a high barrier property to fuel. The above-mentioned kneading with high-shearing is conducted, for example, by means of a twin screw extruder (kneader).

In the case where the EVOH and the specific modified HDPE are kneaded, the EVOH is not specifically limited. However, EVOH having an ethylene proportion of 25 to 50 mol % is preferred in terms of moldability of the alloy material and a barrier property to fuel. Particularly, EVOH having an ethylene proportion of 30 to 45 mol % is more preferred. Further, EVOH having a melting point of 160 to 191° C. is preferred, and particularly, EVOH having a melting point of 165 to 191° C. is more preferred.

The specific modified HDPE is not particularly limited. In the present invention, the specific modified HDPE is obtained, for example, by graft-modifying at least one of unsaturated carboxylic acid and unsaturated carboxylic acid derivative or a compound for modification such as an amine-containing compound (such as methylene diamine) with HDPE in the presence of radical initiator. The specific modified HDPE is preferably present in an amount of 70% to 10% by volume based on 30% to 90% by volume of the EVOH, as mentioned above. This is because when the specific modified HDPE is less than 10% by volume, weldability to the resin fuel tank tends to deteriorate, while when it exceeds 70% by volume, a barrier property to fuel tends to deteriorate. The modification ratio of the specific modified HDPE is 0.01 to 5% by weight, as described above. When the modification ratio is less than 0.01% by weight, the affinity between the EVOH and the specific modified HDPE is deteriorated, and thus a barrier property to fuel tends to deteriorate. On the contrary, when the modification ratio exceeds 5% by weight, a barrier property to fuel tends to deteriorate and work environment for kneading, molding and the like is deteriorated. The specific modified HDPE preferably has a melting point (ISO 3146) of 126° C. to 140° C., more preferably 128° C. to 136° C. The HDPE (high density polyethylene) of the specific modified HDPE means that the specific gravity (ISO 1183) is generally 0.93 to 0.97, and more preferably, 0.93 to 0.96, and also its melting point (ISO 3146) is 120 to 145° C.

In the above-mentioned embodiment, the connecting pipe having a three-layer structure is described. However, it should be noted the present invention is not limited thereto. A connecting pipe according the present invention may have a two-layer structure of a barrier layer 1 and an inner layer 2 formed on an inner peripheral surface thereof, or of a barrier layer 1 and an outer layer 3 formed on an outer peripheral surface thereof. Alternatively, a connecting pipe according to the present invention may have four or more layers by forming a layer or layers, additionally, on an inner or an outer peripheral surface of the three-layer structure. Further, in the above-mentioned embodiment, the entire of the connecting pipe has a three-layer structure from the upper end to the lower end. However, it should be noted the present invention is not limited thereto. For example, only a welding portion with a resin fuel tank may have a three-layer structure while the upper part thereof may be formed by a low fuel permeation material, such as PA12.

The thus obtained joint part of the present invention may be applicable not only for the above-mentioned connecting pipe but also, for example, connecting valves such as a fuel filler valve, an ORVR (Onboard Refueling Vapor Recovery) valve, a VSF (Vent Shaft Float) valve and a V-return valve.

The product of the present invention will be more fully understood from the following Examples along with Comparative Examples. However, the present invention is not limited to Examples.

The materials each for forming a barrier layer, an inner layer and an outer layer were prepared prior to Examples and Comparative Examples as follows.

EVOH (Material for Forming a Barrier Layer)

Two kinds of EVOH a and b having each properties (MFR, specific gravity, melting point, ethylene proportion) as shown in Table 1 were prepared.

TABLE 1

| Type | | Manufacturer | Product Name | MFR D1238 g/10 min | Specific Gravity ASTM D1505 g/cm³ | Melting Point D2117 ° C. | Ethylene Proportion Mol % |
|---|---|---|---|---|---|---|---|
| EVOH | a | KURARAY CO., LTD. | EVAL F101A | 3.8 | 1.19 | 183 | 32 |
| | b | KURARAY CO., LTD. | EVAL F104B | 10 | 1.19 | 183 | 32 |

Two kinds of maleic anhydride-modified HDPE I and II were each prepared as follows.

Maleic Anhydride-Modified HDPE-I (Barrier Layer Material)

Maleic anhydride-modified HDPE-I (modification ratio: 0.2% by weight, melting point: 129° C., maximum tensile strength: 16 MPa) was produced by adding maleic anhydride (content: 0.2% by weight) and di-t-butyl peroxide (content: 1% by weight) to HDPE (NOVATEC HB111R available from Japan Polyethylene Corporation, specific gravity: 0.945, melting point: 129° C.), and melt kneading the thus obtained mixture by a twin screw extruder.

Maleic Anhydride-Modified HDPE-II (Barrier/Inner/Outer Layer Materials)

Maleic anhydride-modified HDPE-II (modification ratio: 0.4% by weight, melting point: 135° C., maximum tensile strength: 15 MPa) was produced by adding maleic anhydride (content: 0.4% by weight) and 2,5-dimethyl-2,5di(t-butyl peroxy)hexane (content: 0.015% by weight) to HDPE (NOVATEC HY430 available from Japan Polyethylene Corporation, specific gravity: 0.956, melting point: 135° C.), and melt kneading the thus obtained mixture by a twin screw extruder.

Alloy Material (Barrier Layer Material)

The ingredients were mixed in proportions as shown in Table 2 and kneaded by a twin screw kneading extruder (TEX30 a available from The Japan Steel Works, LTD.) at 80° C. to produce pellets each made of four types (A to D) of alloy materials, respectively. Each dispersion state of the sea phase and the island phase was observed by means of a scanning electron microscope (S4800 available from Hitachi Technologies Corporation). These results are also shown in the Table 2. As an alloy material (type: E) available commercially, an alloy material of PA4 and polyethylene (CM1801 available from Toray Industries, Inc.) was prepared.

TABLE 2

| | | Alloy material (barrier layer material) | | | |
|---|---|---|---|---|---|
| | | A | B | C | D |
| EVOH | a | 35 | 35 | 50 | — |
| | b | — | — | — | 35 |
| Modified HDPE | I | 65 | — | — | — |
| | II | — | 65 | 50 | 65 |
| Maximum tensile strength (MPa) | | 33.0 | 34.2 | 42.4 | 34.9 |
| Dispersibility | sea phase | | EVOH | | |
| | island phase | | modified HDPE | | |

EXAMPLES 1 TO 7

Figure 2:
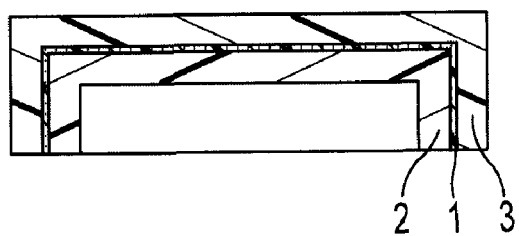
FIG. 2 is a sectional view illustrating a specimen used for evaluation in Examples and Comparative Examples.

As each material for the barrier layer, the inner layer and the outer layer, the materials as shown in the following Table 3 were employed. A three-layered specimen comprising the barrier layer 1, the inner layer 2 and the outer layer 3 and a top portion, as shown in FIG. 2, was produced by insert molding each layer material from the inside in order so as to have a height of 10 mm, an inner diameter of 70 mm and a thickness of each layer as shown in Table 3. Thus, the total thickness of each layer amounted to a thickness of a wall or a top portion. The molding temperature of the insert molding was 260° C.

COMPARATIVE EXAMPLES 1 TO 2

The material as shown in the following Table 4 was employed for Comparative Example 1 and HDPE (NOVATEC HB111R available from Japan Polyethylene Corporation) was employed for. Comparative Example 2. A single-layered specimen having a top portion was each produced by injection molding so as to have the same shape as those of Examples 1 to 7. The thus obtained specimen had a height of 10 mm, an inner diameter of 70 mm and a thickness (of both the wall and the top portion) of 4 mm. The molding temperature of the injection molding was 230° C.

The thus obtained specimens for Examples 1 to 7 and Comparative Examples 1 to 2 were evaluated in accordance with the following characteristics. These results are also shown in the following Tables 3 and 4.

Permeation Amount of Fuel

Figure 3:
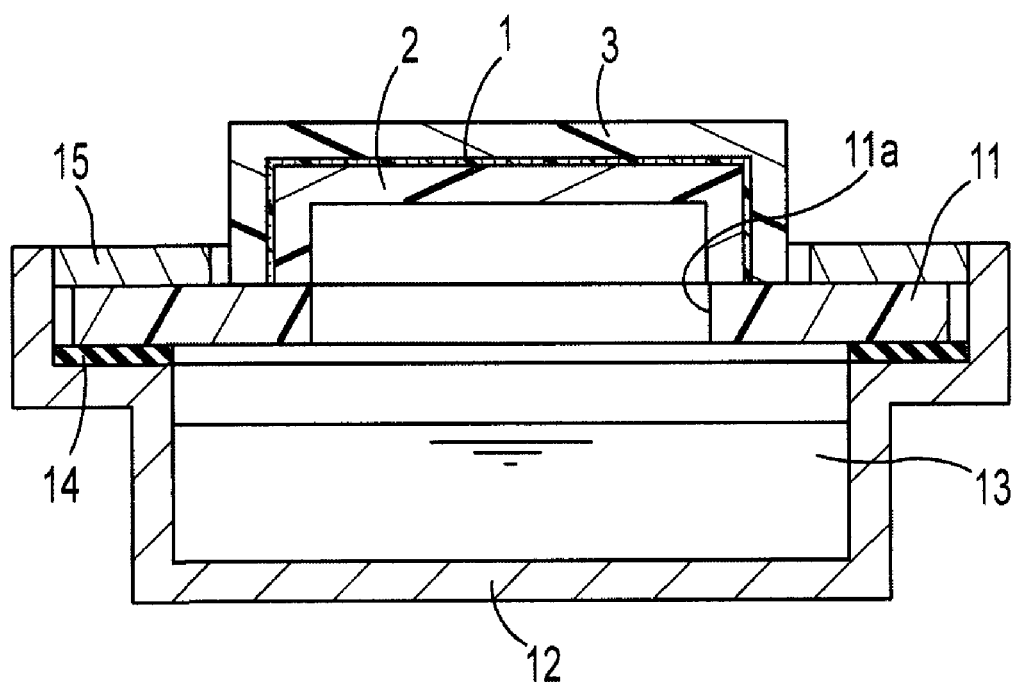
FIG. 3 is a sectional view illustrating a test assembly for measuring a permeation amount of fuel of the specimen in Examples and Comparative Examples.

A sheet material 11 having a five-layer structure of HDPE/modified HDPE/EVOH/modified HDPE/HDPE, as shown in FIG. 3, which corresponds to a resin fuel tank, was prepared. In FIG. 3, each layer of the five layers is not shown. An opening 11a having the same diameter as an inner diameter of a lower end of the specimen was formed. Each specimen was positioned so as to be welded onto a side (a surface of the HDPE layer) of the sheet material 11 by heat plate welding at 240° C. for 20 seconds for producing a test assembly. A cup 12 was prepared and was fed with a fuel mixture 13 (Fuel C:ethanol=90:10 by volume %) prepared by mixing Fuel C (toluene:isooctane=50:50 by volume %) and ethanol. The cup 12 had a shoulder having an extended diameter on an upper end thereof. The shoulder has, in the upper end, an inner peripheral surface formed with an internal thread. The specimen was placed on the shoulder of the cup 12 via an annular seal rubber 14. Further, an annular cover 15 having an external thread was threadedly fitted in the top opening of the cup 12 to tighten the sheet material 11 and thereby close the cup 12 tightly. The thus obtained test assembly was turned upside down, and held in an atmosphere having a temperature of 40° C., and its change in total weight was checked every day for a month as a measure for the fuel permeability of the test assembly. The measured values (permeation amount of fuel) when they were stable were used for evaluation.

Interlaminar Adhesion

Each specimen of Examples 1 to 7 was cut into a 10 mm-wide strip, and then the barrier layer 1, the inner layer 2 and the outer layer 3 at the distal end of the strip were peeled from one another. Each distal end of the thus peeled barrier layer 1, inner layer 2 and outer layer 3 was pinched by each chuck of a tensile tester (available from Orientech Co., Ltd.), and was pulled at a rate of 50 mm/min. As a result, no peeling occurred in all specimens.

Weld Strength (to Tank Material)

Each test assembly obtained by welding each specimen to the sheet material 11 having five-layer structure, corresponding to a resin fuel tank, was cut into a 10 mm-wide strip. Each distal end of the specimen and the sheet material 11 was pinched by each chuck of a tensile tester (available from Orientech Co., Ltd.), and was pulled at a rate of 50 mm/min. As a result, no peeling occurred on an interface of the sheet material 11 and the specimen in all test assemblies and thus sheet material 11 or the specimen (i.e., base material) was broken.

TABLE 3

| | | EXAMPLE | | | | | | |
|---|---|---|---|---|---|---|---|---|
| | | 1 | 2 | 3 | 4 | 5 | 6 | 7 |
| Inner layer | material | Modified HDPE-II | | | | | | |
| | thickness (mm) | 2 | | | | | | |
| Barrier layer | material | Alloy material | | | | | | |
| | | A | A | A | B | C | D | E |
| | thickness (mm) | 0.1 | 0.3 | 0.5 | 0.3 | 0.3 | 0.3 | 0.5 |
| Outer layer | material | Modified HDPE-II | | | | | | |
| | thickness (mm) | 2 | | | | | | |
| Fuel permeation amount (mg · mm/cm²/day) | | less than 0.1 | | | | | | |
| Interlaminar adhesion | inner layer/barrier layer | impossible to be peeled | | | | | | |
| | barrier layer/outer layer | impossible to be peeled | | | | | | |
| | Weldability with tank | 15 MPa (mother material broken) | | | | | | |

TABLE 4

|  |  | COMPARATIVE EXAMPLE | |
|---|---|---|---|
|  |  | 1 | 2 |
| Single layer | material thickness (mm) | Modified HDPE-II 4 | HDPE |
| Fuel permeation amount (mg · mm/cm²/day) |  | 29.0 | 15.0 |
| Weldability with tank |  | 15 MPa (mother material broken) | |

The results show that each permeation amount of fuel was low in Examples 1 to 7 as compared with Comparative Examples 1 to 2, and thus Examples were excellent in low fuel permeability. They also show that no peeling occurred in Examples 1 to 7 and the weld strength to the resin fuel tank was remarkably high.

What is claimed is:

1. A joint part for a resin fuel tank, the joint part having an approximate cylindrical shape and a welding portion at its distal end to be positioned and welded to a rim of an opening end of the resin fuel tank, wherein at least the welding portion comprises an approximate cylindrical barrier layer formed by the following (A) and an approximate cylindrical welding layer formed by the following (B) on at least one surface of an inner periphery and an outer periphery of the barrier layer; wherein (A) is a compound material obtained by blending polyethylene into at least one selected from the group consisting of an ethylene vinyl alcohol copolymer, polyamide, polyester and liquid crystal polymer;

(B) is a high density polyethylene or a modified high density polyethylene; and wherein when (A) and (B) are kneaded with high shearing, (A) forms a matrix, (B) forms a domain, and an island phase of (B) is dispersed in a sea phase of (A).

2. A joint part according to claim 1, wherein main component of the polyethylene of the above-mentioned (A) is an acid-modified polyethylene.

3. A joint part according to claim 2, wherein both melting points of the barrier layer and the welding layer are the same temperature of not less than 220° C.

4. A joint part according to claim 3, wherein the barrier layer has a thickness of 0.05 mm to 0.8 mm.

5. A joint part according to claim 2, wherein the barrier layer has a thickness of 0.05 mm to 0.8 mm.

6. A joint part according to claim 1, wherein both melting points of the barrier layer and the welding layer are the same temperature of not less than 220° C.

7. A joint part according to claim 6, wherein the barrier layer has a thickness of 0.05 mm to 0.8 mm.

8. A joint part according to claim 1, wherein the barrier layer has a thickness of 0.05 mm to 0.8 mm.

* * * * *